United States Patent
Lamontagne et al.

(10) Patent No.: US 7,628,484 B2
(45) Date of Patent: Dec. 8, 2009

(54) EYEWEAR WITH ADJUSTABLE TEMPLES

(75) Inventors: Marc Lamontagne, Repentigny (CA); Paul Isabelle, Saint-Augustin-de-Desmaures (CA); Jean-Christophe Doyon, Terrebonne (CA)

(73) Assignee: North Safety Products Limited, Anjou, Quebec (CA)

( * ) Notice: Subject to any disclaimer, the term of this patent is extended or adjusted under 35 U.S.C. 154(b) by 0 days.

(21) Appl. No.: 12/038,880

(22) Filed: Feb. 28, 2008

(65) Prior Publication Data

US 2009/0219481 A1    Sep. 3, 2009

(51) Int. Cl.
*G02C 5/16*    (2006.01)
(52) U.S. Cl. .................. 351/113; 351/114; 351/119
(58) Field of Classification Search .............. 351/41, 351/111–123
See application file for complete search history.

(56) References Cited

U.S. PATENT DOCUMENTS

| | | | |
|---|---|---|---|
| 5,631,718 A | 5/1997 | Markovitz et al. | |
| 5,790,229 A | 8/1998 | Poloni et al. | |
| 6,059,411 A | 5/2000 | Moody | |
| 6,843,562 B1 | 1/2005 | Ng | |
| 2005/0088613 A1 | 4/2005 | Jackson et al. | |
| 2008/0218682 A1* | 9/2008 | Hogen et al. | 351/113 |

FOREIGN PATENT DOCUMENTS

FR    2 241 225 A    3/1975

* cited by examiner

*Primary Examiner*—Huy K Mai
(74) *Attorney, Agent, or Firm*—Ladas & Parry LLP

(57) ABSTRACT

An eyewear comprising a frame with lens and temples mounted to the frame. Each of the temples comprises a branch having a proximal end, a distal end and an internal wall defining an aperture extending longitudinally along the branch. The internal wall has a first curved portion with a first curvature, the first curved portion being made of a flexible material. Each of the temples further comprises a member slidably moveable in the aperture, the member having a second curved portion with a second curvature, the second curved portion registering with the first curved portion, the second curvature being greater than the first curvature such that movement of the member along the aperture and towards the distal end of the branch displaces the branch from a first position in which a first pressure is applied to a side of a wearer's head to a second position in which a second pressure is applied to the side of the wearer's head, the second pressure being greater than the first pressure.

31 Claims, 6 Drawing Sheets

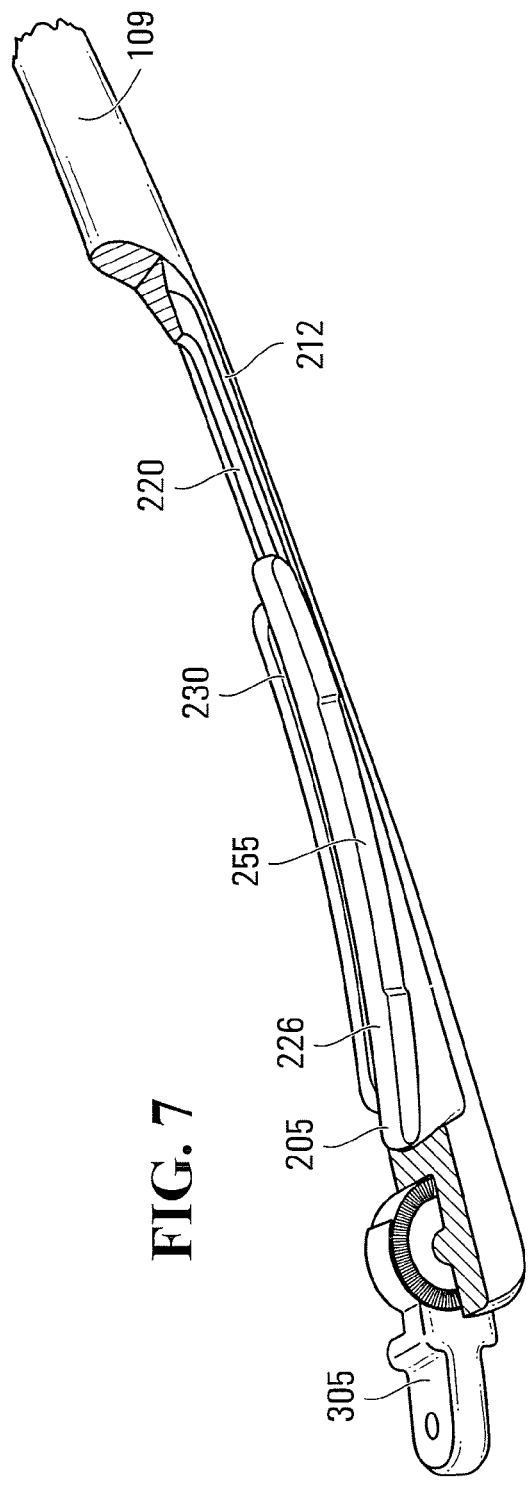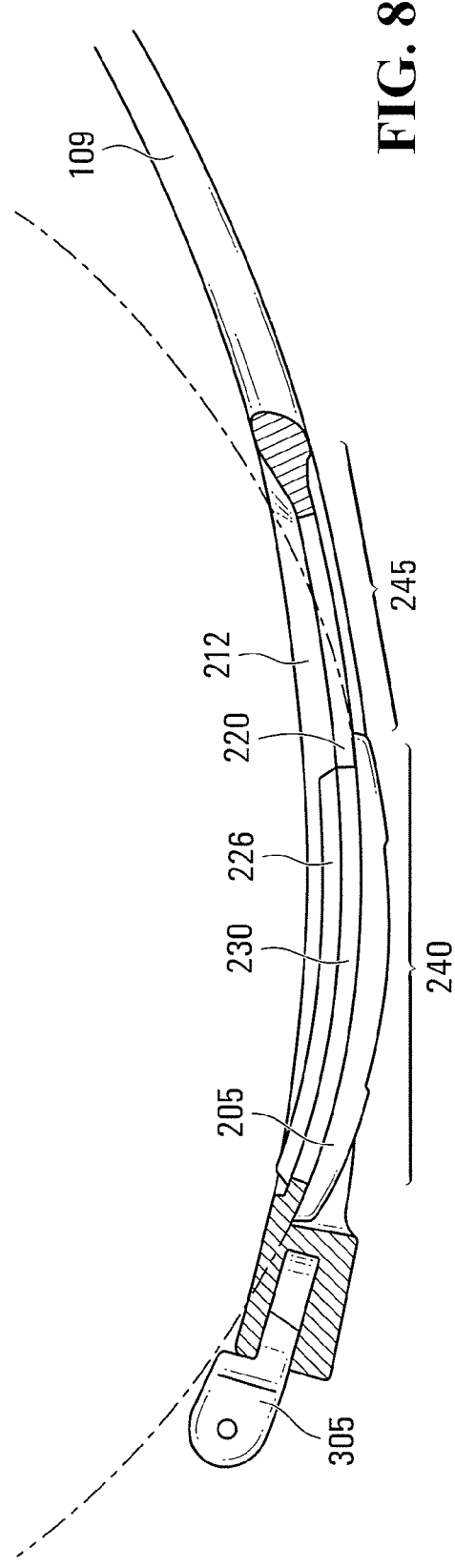

EYEWEAR WITH ADJUSTABLE TEMPLES

FIELD OF THE INVENTION

The present invention relates to eyewear having temples that can be adjusted to fit different shapes of wearer head.

BACKGROUND OF THE INVENTION

Eyewear such as corrective glasses, safety glasses and sun glasses are generally mass produced for sale to a large market base. However, physical characteristics vary greatly from person to person, particularly those of the head and face. As a result, eyewear currently available are never suited for use by everybody and not all available eyewear will fit a potential wearer. For the wearer this translates to frustration and risk as it is necessary to try on many eyewear in order to find one that fits and even then there is a chance that with time an eyewear will be found uncomfortable. For the manufacturer and seller, this means lost profits as individual eyewear cannot be sold but to a limited segment of a purchasing population.

In particular eyewear temple pose problems since they should desirably contour the head of the wearer but there exists many different cranial shapes in the public at large. If the temples of an eyewear do not properly fit the wearer the eyewear can be uncomfortable to wear or improperly secured in wear. Eyewear suffering from such a drawback may not be used to its full value or may be dropped and broken or lost. If the eyewear is protective eyewear, dropping the eyewear from a wearer's head can expose the wearer to the dangers he sought to protect himself from.

Among the solutions that have been attempted in the past is the one described in U.S. Pat. No. 6,059,411 to Paul E. Moody. This patent discloses a temple that can be extended with the extending portion so biased as to wrap around a person's head. However, this eyewear suffers the drawback that it cannot be adjusted to adopt a specific shape or to apply more or less pressure on the side of a wearer's head. Thus the eyewear displaces in this document can prove very uncomfortable or unfitting for a wearer.

In the context of the above, it can be appreciated that there is a need in the industry for an eyewear with adjustable temples that can be made to fit a variety of different wearer's heads.

SUMMARY OF THE INVENTION

In accordance with a first broad aspect, the present invention provides an eyewear comprising a frame with lens and temples mounted to the frame. Each of the temples comprises a branch having a proximal end, a distal end and an internal wall defining an aperture extending longitudinally along the branch. The internal wall has a first curved portion with a first curvature, the first curved portion being made of a flexible material. Each of the temples further comprises a member slidably moveable in the aperture, the member having a second curved portion with a second curvature, the second curved portion registering with the first curved portion, the second curvature being greater than the first curvature such that movement of the member along the aperture and towards the distal end of the branch displaces the branch from a first position in which a first pressure is applied to a side of a wearer's head to a second position in which a second pressure is applied to the side of the wearer's head, the second pressure being greater than the first pressure.

In accordance with a second broad aspect, the present invention provides an eyewear comprising a frame with lens and temples mounted to the frame. Each of the temples comprises a branch having proximal and distal ends and a first curved portion with a first curvature. The first curved portion is made of a flexible material. Each of the temples further comprises a member slidably mounted to the branch, the member having a second curved portion with a second curvature, the second curved portion registering with the first curved portion, wherein the second curvature is different than the first curvature such that movement of the member along the branch displaces the branch from a first position in which a first pressure is applied to a side of a wearer's head to a second position in which a second pressure is applied to the side of the wearer's head, the second pressure being greater than the first pressure.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which:

FIG. 7 shows a perspective broken-away view of the temple of FIG. 4;

FIG. 8 shows another broken-away view of the temple of FIG. 4;

Figure 1:
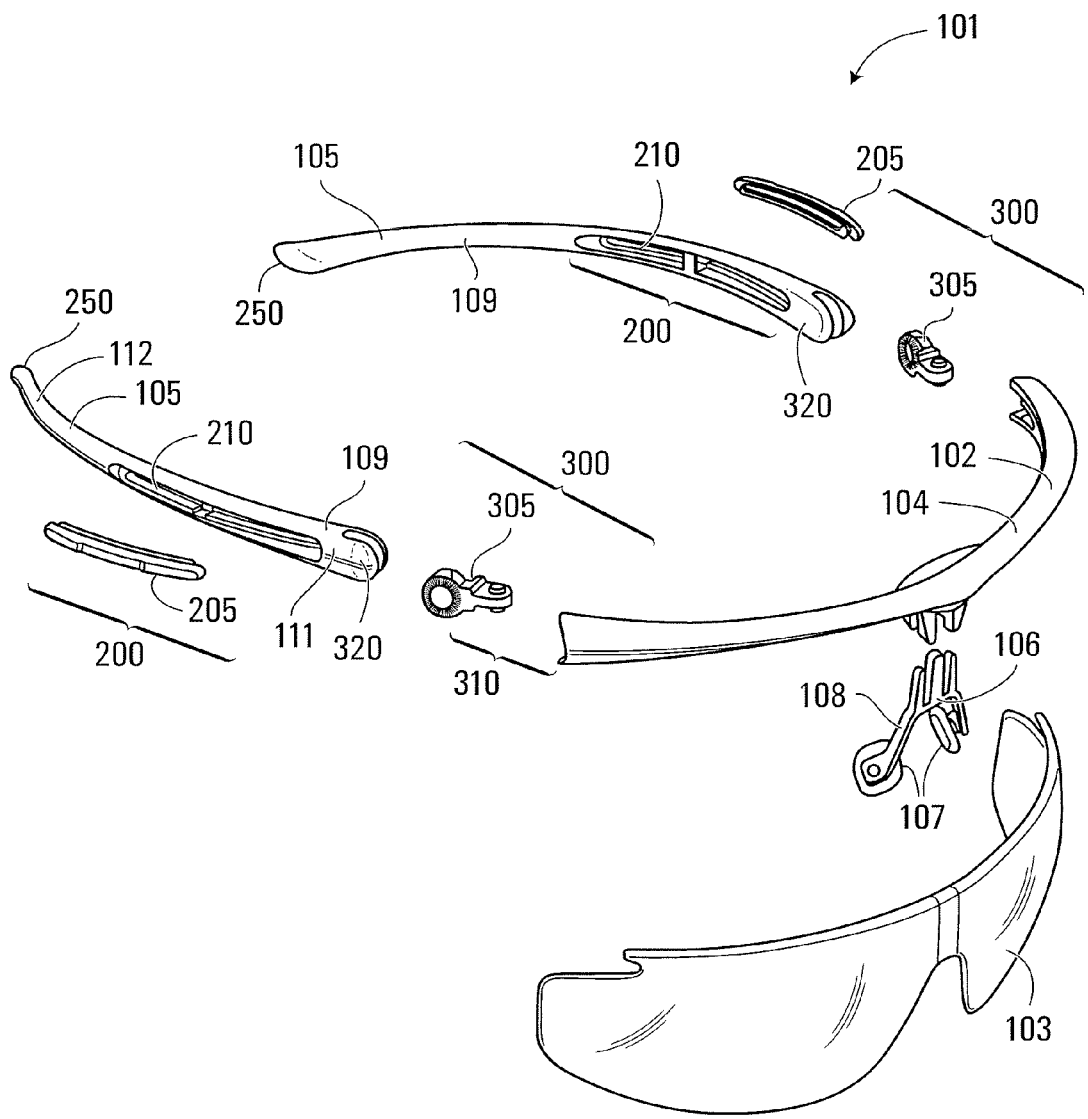
FIG. 1 shows an exploded view of an eyewear constructed in accordance with an embodiment of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS

It should be clearly understood that like reference numerals are intended to identify the same structural elements, parts, portions or surfaces consistently throughout the several drawing figures, as such elements, parts, portions or surfaces may be further described or explained by the entire written specifications, of which this detailed description is an integral part. In describing the embodiments, specific terminology is resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader.

Figure 2:
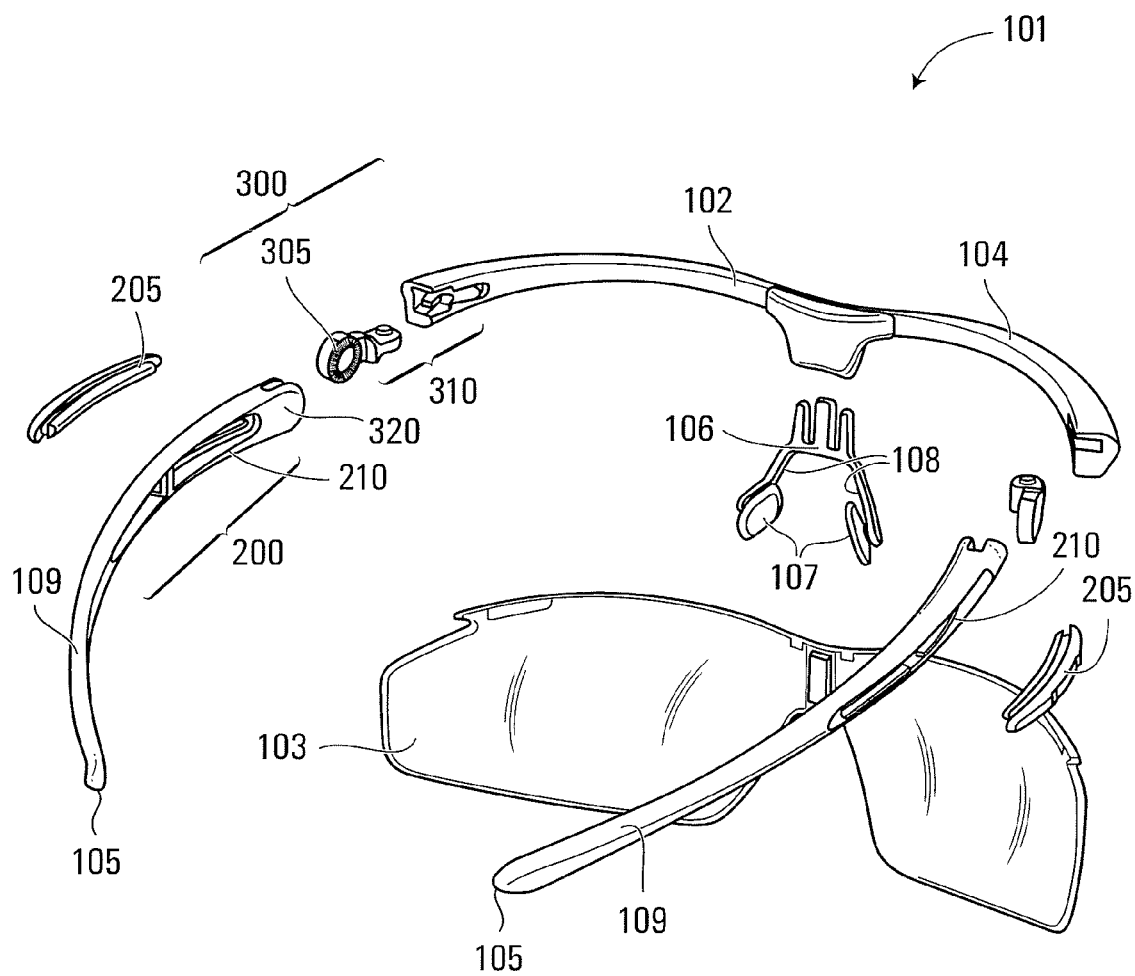
FIG. 2 shows the eyewear of FIG. 1 from a different perspective, also in an exploded view.
Figure 3:
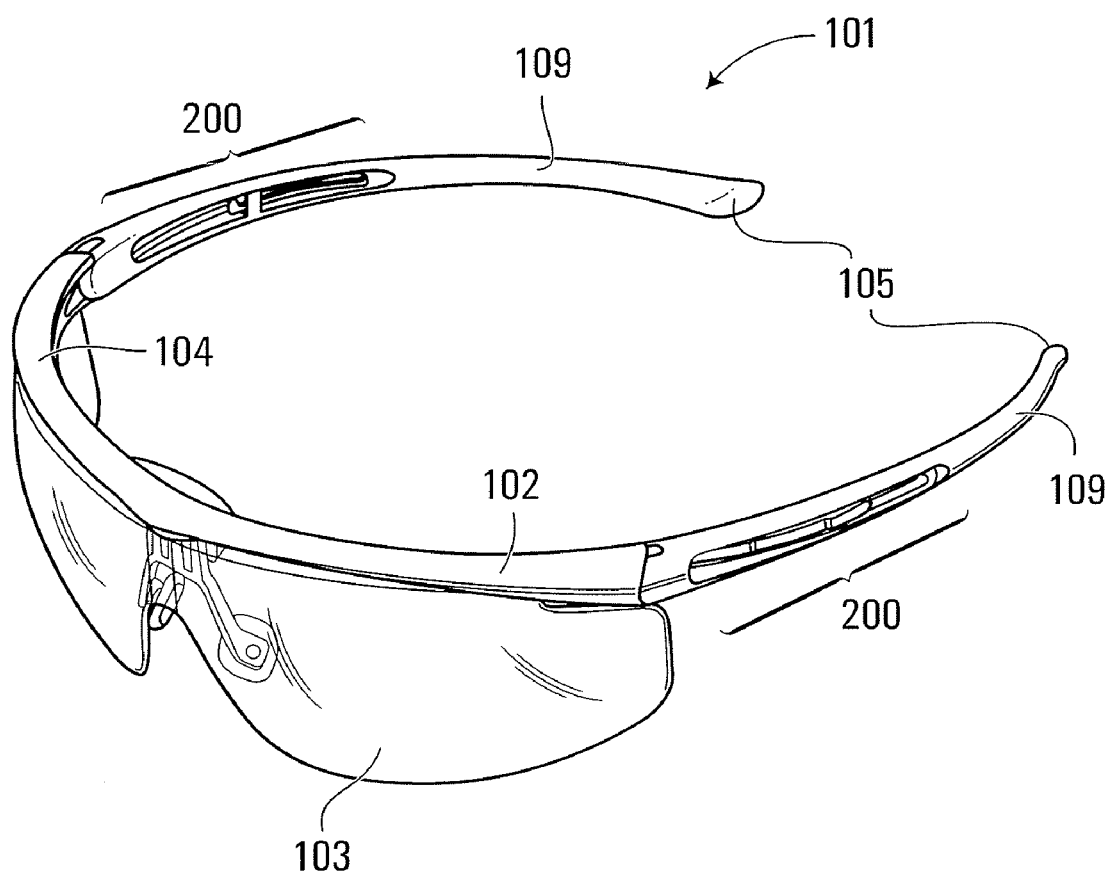
FIG. 3 shows a perspective view of the eyewear.

FIGS. 1 and 2 are exploded views of an eyewear 101 in accordance with a non-limiting embodiment and FIG. 3 is a front perspective view of the eyewear 101. As shown in FIGS. 1 to 3, the eyewear 101 is a pair of safety glasses having a frame 102, lenses 103, a nosepiece 106 featuring two nose pads 107 and a pair of temples 105. In use, eyewear 101 rests comfortably on a user's head such that lenses 103 substantially cover the user's field of vision or substantially block the user's eyes from external elements. Eyewear 101 should be held securely such that eyewear 101 does not shift or fall off during regular use.

The nose piece 106 provides a point of support for the eyewear and may be fastened to the frame 102. In a non-limiting embodiment, nosepiece 106 is an adjustable nosepiece, displaceable along a generally vertical axis for adjusting to various facial constructions. In this example, the nosepiece 106 comprises a releasable clamping mechanism that holds nosepiece 106 at a given position in a generally vertical channel. In order to adjust the height of the nosepiece with respect to the frame 102 and/or lenses 103, the clamping mechanism is released and nosepiece 106 is displaced vertically to a desired position whereupon the clamping mechanism is reengaged. Nosepiece 106 also comprises nose pads 107 at the end of nose pad branches 108. In a non-limiting embodiment, the position of nose pads 107 with respect to the rest of the nosepiece 106 is also adjustable, for example by having deformable nose pad branches 108. In wear, the nosepiece 106 provides a point of support for the eyewear 101 and prevents movement of the eyewear relative to the face in certain directions, notably in the downwards (towards the chin) direction but also in the rearwards (towards the back of the head) direction. It is to be understood that although the nosepiece 106 here has been described as an adjustable nosepiece any other arrangement may be used. For example, the nosepiece 106 may take the form of any nose-supporting structure and may be embedded in or integral with the lenses 103 or frame 102 or may even be completely absent.

In the non-limiting embodiment of FIG. 1, the frame 102 is a semi-rimless frame made up primarily of a frame component 104 arranged along the top of the lenses 103 generally in a horizontal plane. Lenses 103 are fastened to frame component 104. The frame 102 holds the lenses 103 in place and may optionally rest, in wear, against the wearer's face thus anchoring the eyewear against certain movements, such as rearward movement. The frame 102 does not need to be a semi-rimless frame as illustrated in FIG. 1 but can take many shapes. For example, the frame can be a full frame (fully surrounding a unitary or a pair of lenses 103) or three-piece rimless (made up of three pieces anchored in the lenses 103). The frame 102 may be distinct from the lenses 103 as shown here or may be integral with the lenses 103.

Lenses 103 may be protective lenses, shaded lenses, optical-correction lenses or any other lenses. In the non-limiting embodiment shown here, lenses 103 is a unitary protective lens covering a substantial portion of the field of vision of both eyes. However it is to be understood that lenses 103 may be a pair of disjoint lenses or any other arrangement of lenses 103.

In the non-limiting embodiment shown in FIG. 1, eyewear 101 features a pair of temples 105 having a connection with frame 102 that includes a connection member 305 connected with the frame 102 by a hinge assembly 310. Hinge assembly 310 permits the pivotal motion of temples 105 about a first axis between an open and a closed position. Temples 105 each include a branch 109 that extends along a second axis from a proximal end 111, near the frame 102 to a distal end 112, which in wear is near the back of the wearer's head. In this non-limiting example, the branches 109 extend at an angle approximately normal to the frame component 104 when in the open position and can pivot to a closed position where they are angled approximately parallel to frame component 104. The eyewear 101 can thus be folded to a more compact form when not in use. It should be noted, however, that temples 105 can be connected to the frame 102 by any suitable means, with or without connection member 305. Furthermore, it is not necessary for temples 105 to be hinged to the frame 102, but temples 105 may be rigidly connected to the frame 102. Also, while temples 105 are drawn here as two separate branch-like component, it should be understood that any of a number of temple arrangement, forms and shapes are possible. For example, temples 105 may loop around a wearer's ear or head.

When the eyewear is worn, the temples 105 lie along the side of the wearers head and preferably contact both the side of the wearer's head and the upper auricular sulcus. The point of contact of the temple 105 with the upper auricular sulcus provides a point of anchoring against downward motion and thus helps hold the eyewear in place despite the pull of gravity. At the area of contact with the side of the wearer's head, the temples 105 may exert pressure against the side of the wearer's head with the resulting friction helping secure the eyewear in a given position on the wearer's head. Furthermore, although the branches 109 are said to extend along the second axis, it should be noted that the branches 109 do not necessarily have a perfectly straight form but are preferably curved to embrace a wearer's physical features. Thus branches 109 may preferably curve around the wearer's head, and optionally around the auricular sulcus and thus anchor the eyewear 101 against movement in multiple directions. It is to be understood that a branch 109 so curved is still said to extend along the second axis insofar as it approximates the second axis.

Thus the shape of branch 109 has an impact on the performance of eyewear 101. If the shape of branch 109 is not suited for the wearers head, eyewear 101 will be improperly secured or uncomfortable to wear. In order to adjust the shape of branch 109 to fit different heads, a novel adjusting mechanism 200 is provided in branch 109. Adjusting mechanism 200 comprises a section of branch 109 and a sliding member 205. Sliding the sliding member 205 within the adjusting mechanism causes the branch 109 to change its form, for example by changing its curvature, such that it becomes better suited for a different shape of wearer head.

Figure 4:
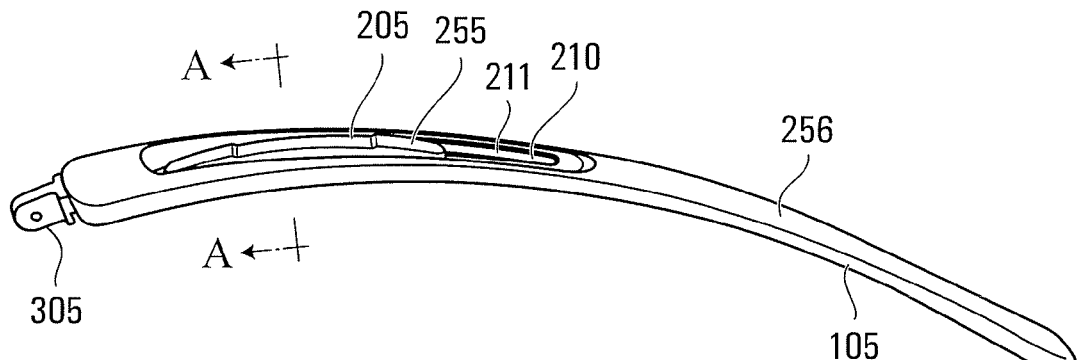
FIG. 4 shows a perspective view of the temple of the eyewear of FIG. 3.

The adjusting mechanism will now be described in accordance to a non-limiting embodiment. FIG. 4 shows a close-up of a temple 105 in accordance with a non-limiting embodiment. Branch 109 comprises an aperture 210 in which is lodged a sliding member 205.

Figure 5:
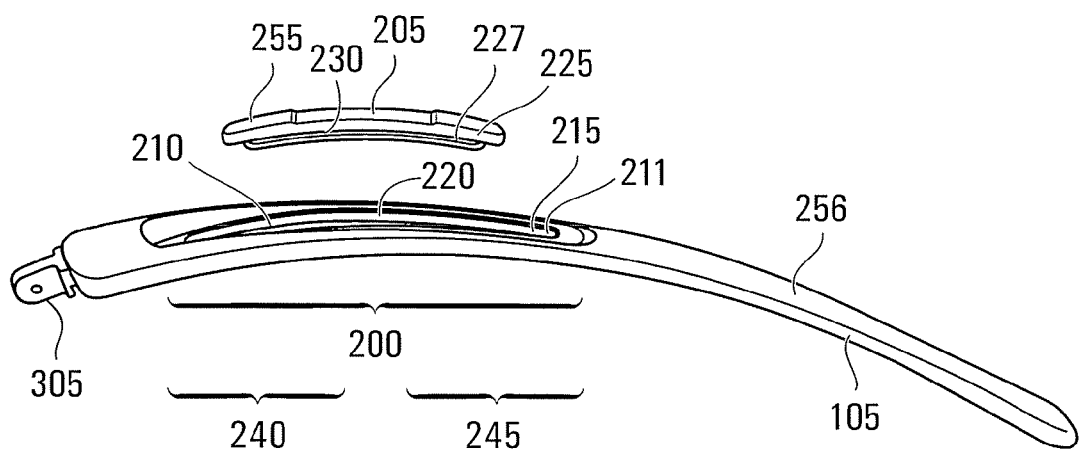
FIG. 5 shows an exploded view of the temple of FIG. 4.

As shown in an exploded view on FIG. 5, aperture 210 is defined by an internal wall 215 that has a top side 211 and a bottom side 212 that are opposed to one another. The two opposed sides of internal wall 215 each comprise a projection 220 that extend inwardly (downwardly from the top side and upwardly from the bottom side). In the non-limiting example shown, projection 220 takes the form of an elongated rail-like protrusion in the internal wall 215 generally following the longitudinal direction of the aperture. It should be noted that it is not necessary for projection 220 to be present on both opposed sides and that it may only be present on the top side 211 or the bottom side 212.

Figure 6:
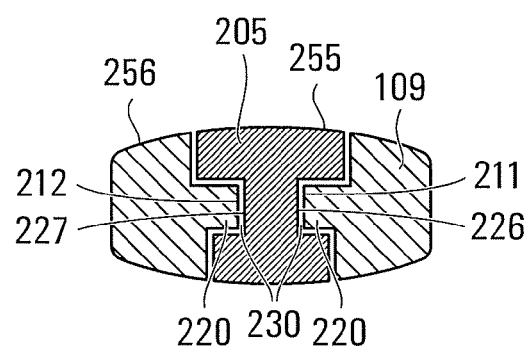
FIG. 6 shows a cross-section of the temple of FIG. 4.

Sliding member 205 is slidably mounted within aperture 210. Sliding member 205 is shaped to fit into the aperture 210 and comprises a surrounding wall 225 having a top wall 226 and a bottom wall 227 that are opposed to each other and that register respectively with the top side 211 and the bottom side 212 of the internal wall 215. In the non-limiting embodiment shown, the top and bottom walls comprise an elongated groove 230 in which fits projection 220. Sliding member 205 is longitudinally shorter than aperture 210 and can slide in the longitudinal direction within aperture 210. FIG. 6 shows a cross-section of branch 109 (on its side) with sliding member 205 inserted, the complementary relationship of groove 230 and projection 220 being clearly visible.

In addition to the above, sliding member comprises an external side 255, accessible to a wearer, that preferably follows generally the curvature of the top external side 256 of the branch. A wearer can apply force to external side 255 to slide slidable member 205 in aperture 210.

The branch 109 in at least a portion of the area of the adjusting mechanism 200 is made of flexible material, such that it can be deformed by appropriate forces. Preferably branch 109 returns to its original shape when the forces are removed. Sliding member 205 is preferably made of a different material than the branch 109, which material is less flexible than that of the branch 109 in the area of the adjusting mechanism 200 and is therefore not as easily deformed. Sliding member 205 is thus made of a rigid material In a non-limiting example, the portion of branch 109 around the adjusting mechanism 200 is made of polycarbonate or of a combination of polycarbonate and polyester while the sliding member 205 is made of either Nylon™ 6 with fiber glass (for example, with 30% fiber glass), Nylon™ 66 or aluminum. In another non-limiting example, the portion branch 109 around the adjusting mechanism 200 is made of a material selected from the group consisting of Xylex™ X7203 by GE, Xylex™ X8300 by GE, Durolon™ VR-2210 by Policarbonatos do Brasil and Lexan™ EXL 1483C by GE. In a non-limiting example, the sliding member 205 is made of either Ultramid™ B3ZG6 by BASF or aluminum 380.

Within the curve-adjusting section 200, branch 109 comprises a curved portion which in this non-limiting example is the projection 220. Projection 220 has a first curvature in the longitudinal direction in a horizontal plane. The first curvature is not necessarily constant but may be a function and even a discontinuous function. The first curvature may thus include a plurality of different radii of curvature and a plurality of different centers of curvature. In the non-limiting embodiment illustrated here, projection 220 has two sections 240, 245 each with a different constant curvature. In FIG. 5, section 240 is shown to be of similar size to section 245 but slightly bigger. It should be noted that the two sections can have any size relative to one another and that section 240 can be bigger, equal or smaller than section 245. It is to be understood that the curved portion of branch 109 may actually be partially or entirely straight, the curvature being of zero (infinite radius of curvature) where the projection 220 is straight.

Sliding member 205 include a curved portion which, in this non-limiting example is groove 230. Groove 230 has a second curvature which is different from the first curvature and which may be constant. In the non-limiting embodiment illustrated groove 230 has the same curvature as projection 220 has in section 240.

A curvature can be defined here by a radius of curvature and optionally by center of curvature. A tighter curve, having a shorter radius of curvature is said to have a higher curvature than a more elongated curve having a longer radius of curvature. The tighter curve has the greater curvature. The radius of curvature is defined here in the traditional mathematical sense, that is, it is the radius of an osculating circle at a point on a curve. While the radius of curvature is a constant at any given point on a curve, it can vary from point to point. Thus the radius of curvature, and likewise the curvature itself can be defined as a function along a path, such as along the path of a curve.

It is to be understood that for two curvatures to be the same, they must have the same radius of curvature along their entire length. Therefore, if the projection 220 in section 240 has the same curvature as the groove 230, the entire length of the groove 230 will register naturally with the projection 220 in section 240. However, the above withstanding, projection 220 is still considered to have a different curvature than groove 230 because beyond section 240, projection 220 does not have the same (in this example, constant) curvature as groove 230.

FIGS. 7 and 8 show a broken-away view of temple 105 with the branch 109 being cut away on one side of the aperture to better show the placement of the sliding member 205 within aperture 210. Here, sliding member 205 is confined within the aperture 210 but can slide longitudinally within it. Sliding member 205 is mated with section 240 of the projection 220, which is in a part of aperture 210 that is adjacent to the proximal end of branch 109. When sliding member 205 registers with section 240 of projection 220, sliding member is said to be in the neutral position. Since section 240 of projection 220 has the same (here, constant) curvature as groove 230 (an osculating circle is shown here in dotted line), the curved projection 220 fits naturally within the curved groove 230 and no force is applied by the rigid sliding member 205 onto the elastic branch 109. Advantageously it is not necessary for the projection 220 to follow exactly the curvature of branch 109 and branch 109 is therefore not required to have the curvature of groove 230 around section 240. Instead here the projection 220 deviates from the center of branch 109 such that internally to branch 109 the projection 220 can have the same curvature as groove 230 in section 240 while the branch itself has a lower curvature even around section 240 of projection 220.

Figure 9:
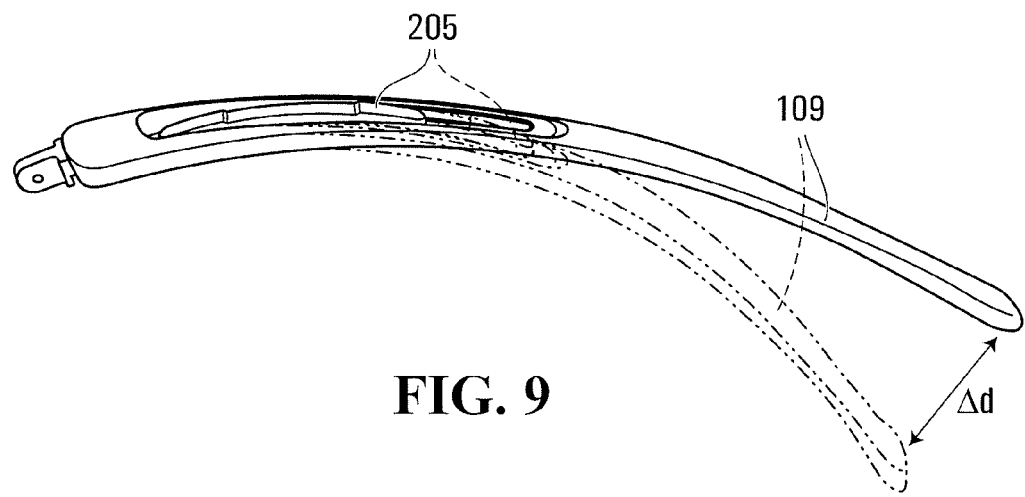
FIG. 9 shows the temple of FIG. 4 with the sliding member in two different positions.

Section 245 is adjacent to section 240 and has a lower curvature than groove 230. The projection 220 in section 245 nevertheless has dimensions (e.g. width, depth) allowing it to fit into groove 230 as does the projection 220 in section 240. As sliding member 205 is manually slid towards section 240, the portions of projection 220 entering groove 230 are forced to conform to the curvature of groove 230 and bend accordingly. Preferably, sliding member 205 does not get significantly deformed by the projection 220 pressing against the groove 230 but rather causes the projection itself to acquire the curvature of the groove 230 where it lies in the groove. The projection 220 being integral with the rest of branch 109, as projection 220 is bent to a certain curvature the portion of branch 109 that is adjacent to projection 220 follows, causing branch 109 to acquire a different curved shape. FIG. 9 shows the deformation of branch 109 as sliding member 205 is moved over the projection from section 240 to section 245. In this example, the tip 250 of the distal end of temple 105 is displace a distance of 0.125 to 0.5 inches as the sliding member 205 is moved from one longitudinal end of aperture 210 to the other longitudinal end of aperture 210. Branch 109 does not bend in the area surrounding section 240 but deforms around the area surrounding section 245 where the projection 220 has been bent in groove 230. Since in this non-limiting embodiment, the projection 220 is not deformed in section 240 whether the sliding member 205 is present there or not, it is not necessary for the projection 220 in section 240 or for the branch 109 surrounding this section to be made of elastic material that can be bent by sliding member 205. However in the present non-limiting embodiment, most of the branch 109 including all of the region of/surrounding adjustment mechanism 200 is made of the same material.

Figure 10A:
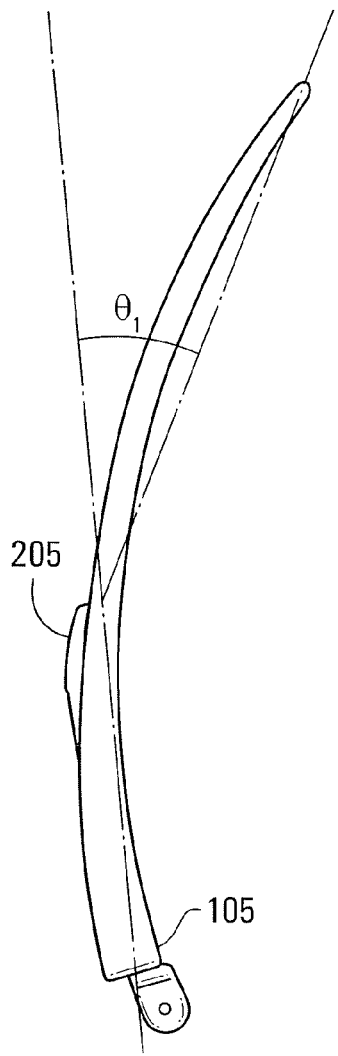
FIG. 10A shows the temple of FIG. 4 with the sliding member in a first position.
Figure 10B:
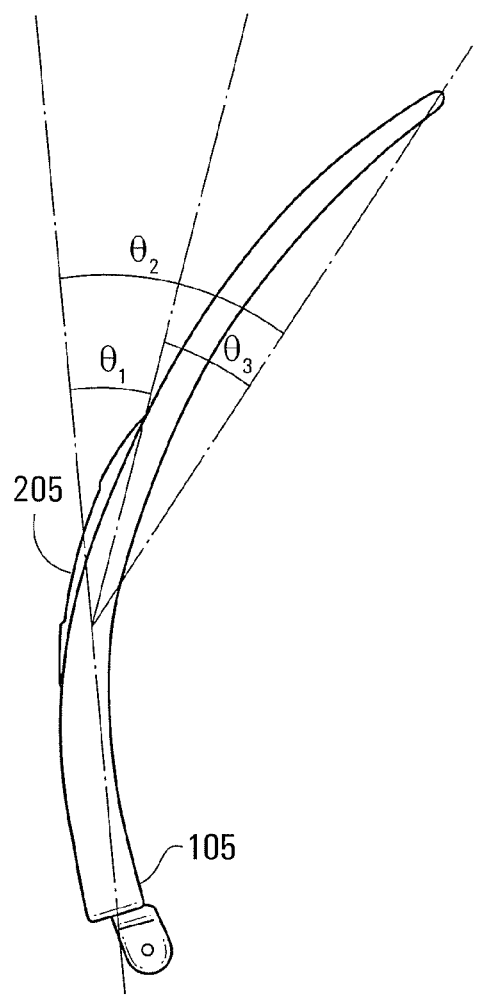
FIG. 10B shows the temple of FIG. 4 with the sliding member in a second position.

FIGS. 10A and 10B offer another view of the effect on temple 105 of sliding the sliding member 205. FIG. 10A shows temple 105 with sliding member 205 in its neutral position. FIG. 10B shows temple 105 with the sliding member 205 moved to the opposite end of aperture 210. As shown, the tip 240 of distal end of temple 105 is at an angle from an axis drawn between the proximal end of temple 105 and the point where temple 105 begins to deform when sliding member 205 is moved out of its neutral position. As the sliding member is moved away from its neutral position, the angle increases until the tip of the distal end has been displaced to a maximum distance from its starting position of between 0.125 and 0.5 inches.

In a non-limiting embodiment, the radius of curvature of groove 230 and projection 220 are between 1.5 and 10 inches. In another non-limiting embodiment, the groove 230 of the sliding member 205 has a constant radius of curvature of between 2.5 and 3 inches while the projection 220 has a varying radius of curvature of between 2.5 and 7 inches. It is possible, but not necessary, for the radius of curvature of the projection 220 in section 245 to be constant. In a specific non-limiting embodiment, groove 230 has a constant radius of curvature 2.5 inches while projection 220 includes a section 240 complementary to groove 230, having the same radius of curvature of 2.5 inches and another section 245 having a radius of curvature of 7 inches. In another non-limiting embodiment, the radius of curvature of the projection 220 in section 245 has a radius of curvature varying from 2.5 inches, at a point adjacent to section 240, to 7 inches.

The above example has been provided to illustrate and not limit the invention. It is to be understood that many other embodiments are possible.

Although the branch 109 has been shown here as having a projection 220 and the sliding member 205 as having a groove 230 to accommodate the projection 220, it will be appreciated that this can easily be reversed. In other words, the branch 109 could have the groove, and the sliding member the projection without departing from the intended scope of the invention. In this case opposed walls 226 and 227 would have a projection extending outwardly (upwardly from 226 and downwardly from 227) into grooves in opposed sides 211 and 212.

It is also not necessary for the sliding member to be nested within an aperture in the branch 105. Instead, sliding member may envelope, surround or partially surround branch 109 or otherwise define a channel extending longitudinally along said member in which branch 109 is received. For example, sliding member 205 may have a tubular construction, a C-shaped cross-section or any other suitable shape. Also, while the projection 220 has been shown here on both sides of aperture 210, it is to be understood that the shape and position of projection 220 shown here is only one of many possible arrangements and that there may be only one projection, or more than two, and that they may be positioned anywhere suitable including on an outer wall of branch 109. Furthermore, it is not necessary for the curved portion that engages sliding member 205 to be a projection, to be inside an aperture or to be part of an internal wall, but can be any suitable curved surface such as an outer wall of branch 109. Likewise, it is not necessary for the curved portion of sliding member 205 to be a groove or a projection but it can be any suitable portion of sliding member 205 such as the internal wall of a channel defined by sliding member 205.

In the non-limiting embodiment shown, the branch 109 has a first curved portion having a first curvature that is a discontinuous function featuring two constant curvatures. It will be appreciated, however that a wide variety of different curvatures are possible and may be suited for different applications. For example, the first curvature could be a function having a range of smoothly varying curvature (in other words curvature could be a function that is non-constant and continuous over a part of, or over the entire, first curved portion). Also, although the projection 220 has been shown here as including a section 240 having the same curvature as the sliding member 205, there may be more than one such sections or none at all and such a section can be positioned anywhere in adjustment mechanism 200 deemed suitable. For example, the neutral position mentioned above may be located in a part of adjustment mechanism adjacent to the distal end of temple 105.

It is to be understood that although the sliding member 205 has been illustrated here as having a curved portion with a greater curvature than the curved portion of branch 109, sliding member 205 may have a different or a smaller curvature than the curved portion of branch 109. In another non-limiting embodiment, section 240 of projection 220 still has the same curvature as groove 230 of sliding member 205 but section 245 has a higher curvature (a smaller radius of curvature) than sliding member 205. In this embodiment, moving the sliding member 205 out of its neutral position causes the branch 109 to deform such as to adopt a less curved shape. It is also possible for sliding member 205's curved portion to be more curved than a certain section of the curved portion of branch 109 but less curved than another section.

It should further be understood that even though adjusting mechanism has been shown here to cause a change in curvature in branch 109 in a generally horizontal plane, adjusting mechanism 200 could be used to adjust the shape of branch 109 in any other manner, for example by causing a change in curvature in a generally vertical plane.

The invention claimed is:

1. Eyewear comprising a frame with lens and temples mounted to said frame, each of said temples comprising:
    (a) a branch having a proximal end, a distal end and an internal wall defining an aperture extending longitudinally along said branch, said internal wall having a first curved portion with a first curvature, said first curved portion being made of a flexible material; and
    (b) a member made of a rigid material, said member being slidably moveable in said aperture, said member having a second curved portion with a second curvature, said second curved portion registering with said first curved portion, said second curvature being greater than said first curvature such that movement of said member along said aperture and towards said distal end of said branch displaces said branch from a first position in which a first pressure is applied to a side of a wearer's head to a second position in which a second pressure is applied to the side of the wearer's head, said second pressure being greater than said first pressure.

2. Eyewear as defined in claim 1, wherein said branch is entirely made of said flexible material.

3. Eyewear as defined in claim 2, wherein said internal wall has top and bottom internal opposed sides and wherein said first curved portion comprises a top curved groove provided on said top side and a bottom curved groove provided on said bottom side.

4. Eyewear as defined in claim 3, wherein said member has top and bottom opposed sides and an external side and wherein said second curved portion comprises a top curved projection extending upwardly from said top internal side and a bottom curved projection extending downwardly from said bottom internal side.

5. Eyewear as defined in claim 4, wherein said top curved projection registers within said top curved groove and said bottom curved projection registers within said bottom curved groove.

6. Eyewear as defined in claim 2, wherein said branch is made of a polycarbonate or a combination or polycarbonate and polyester.

7. Eyewear as defined in claim 2, wherein said branch is made of a material selected from the group consisting of Xylex™ X7203, Xylex™ X8300, Durolon™ VR-2210 and Lexan™ EXL 1483C.

8. Eyewear as defined in claim 1, wherein said internal wall has top and bottom internal opposed sides and wherein said first curved portion comprises a top curved projection extending downwardly from said top internal side and a bottom curved projection extending upwardly from said bottom internal side.

9. Eyewear as defined in claim 8, wherein said member has top and bottom opposed sides and an external side and wherein said second curved portion comprises a top curved groove provided on said top side of said member and a bottom curved groove provided on said bottom side of said member.

10. Eyewear as defined in claim 9, wherein said top curved projection registers within said top curved groove and said bottom curved projection registers within said bottom curved groove.

11. Eyewear as defined in claim 1, wherein said member is made of Nylon™ 66, aluminum; or a combination of Nylon™ 6 with fiber glass.

12. Eyewear as defined in claim 1, wherein said member is made of aluminum.

13. Eyewear as defined in claim 1, wherein said first curved portion has a radius of curvature of between 2.5 inches and 7 inches.

14. Eyewear as defined in claim 1, wherein said second curved portion has a radius of curvature of between 2.5 inches and 3 inches.

15. Eyewear comprising a frame with lens and temples mounted to said frame, each of said temples comprising:
  (a) a branch having proximal and distal ends and a first curved portion with a first curvature, said branch being entirely made of a first material having a first flexibility; and
  (b) a member made of a second material having a second flexibility, said member being slidably mounted to said branch, said member having an external side accessible by a wearer when said eyewear is worn by the wearer and a second curved portion with a second curvature, said second curved portion registering with said first curved portion, wherein said first flexibility is greater than said second flexibility and said second curvature is different than said first curvature such that, in use, when the wearer applies a sliding force to said external side, movement of said member along said branch displaces said branch from a first position, in which a first pressure is applied to a side of the wearer's head, to a second position, in which a second pressure is applied to the side of the wearer's head, said second pressure being greater than said first pressure.

16. Eyewear as defined in claim 15, wherein said second curvature is greater than said first curvature and wherein movement of said member is towards said distal end of said branch.

17. Eyewear as defined in claim 16, wherein said branch comprises an internal wall defining an aperture extending longitudinally along said branch.

18. Eyewear as defined in claim 17, wherein said member is slidably mounted within said aperture.

19. Eyewear as defined in claim 18, wherein said internal wall has top and bottom internal opposed sides, said first curved portion comprising a top curved projection extending downwardly from said top internal side and a bottom curved projection extending upwardly from said bottom internal side.

20. Eyewear as defined in claim 19, wherein said member has top and bottom opposed sides and an external side, said second curved portion comprising a top curved groove provided on said top side of said member and a bottom curved groove provided on said bottom side of said member.

21. Eyewear as defined in claim 20, wherein said top curved projection registers within said top curved groove and said bottom curved projection registers within said bottom curved groove.

22. Eyewear as defined in claim 16, wherein said branch is made of a combination of polycarbonates and polyester.

23. Eyewear as defined in claim 16, wherein said branch is made of a material selected from the group consisting of Xylex™ X7203, Xylex™ X8300, Durolon™ VR-2210 and Lexan™ EXL 1483C.

24. Eyewear as defined in claim 16, wherein said member is made of Nylon™ 66, aluminum, or a combination of Nylon™ 6 with fiber glass.

25. Eyewear as defined in claim 16, wherein said member is made aluminum.

26. Eyewear as defined in claim 16, wherein said member comprises an internal wall defining a channel for receiving said branch, said channel extending longitudinally along said member.

27. Eyewear comprising a frame with lens and temples mounted to said frame, each of said temples comprising:
  (a) a branch having an internal wall defining an aperture extending longitudinally therealong, proximal end, a distal ends and a first curved portion with a first curvature, said first curved portion being made of a first material having a first flexibility; and
  (b) a member made of a second material having a second flexibility, said member being slidably mounted to said branch, said member having a second curved portion with a second curvature greater that said first curvature, said second curved portion registering with said first curved portion, wherein said first flexibility is greater than said second flexibility and said second curvature is different than said first curvature such that, in use, movement of said member along said branch and towards said distal end of said branch displaces said branch from a first position, in which a first pressure is applied to a side of a wearer's head, to a second position, in which a second pressure is applied to the side of the wearer's head, said second pressure being greater than said first pressure.

28. Eyewear as defined in claim 27, wherein said member is slidably mounted within said aperture.

29. Eyewear as defined in claim 28, wherein said branch is entirely made of said first material.

30. Eyewear as defined in claim 29, wherein said member has an external side accessible by the wearer when said eyewear is worn by the wearer.

31. Eyewear as defined in claim 28, wherein said internal wall has top and bottom internal opposed sides, said first curved portion comprising a top curved projection extending downwardly from said top internal side and a bottom curved projection extending upwardly from said bottom internal side; and wherein said member has top and bottom opposed sides, said second curved portion comprising a top curved groove provided on said top side of said member and a bottom curved groove provided on said bottom side of said member.

* * * * *